(12) United States Patent
Abel (10) Patent No.: US 6,830,170 B2
(45) Date of Patent: Dec. 14, 2004

(54) COLLAPSIBLE DECOY BAG (76) Inventor: Gary V. Abel, 3882 Whitebrook La., Ellicott City, MD (US) 21042

( * ) Notice: Subject to any disclaimer, the term of this patent is extended or adjusted under 35 U.S.C. 154(b) by 98 days.

(21) Appl. No.: 10/394,432

(22) Filed: Mar. 20, 2003

(65) Prior Publication Data

US 2003/0218039 A1 Nov. 27, 2003

Related U.S. Application Data (60) Provisional application No. 60/366,365, filed on Mar. 20, 2002.

(51) Int. Cl.$^7$ .................................................. A45F 3/04
(52) U.S. Cl. ...................... 224/634; 224/576; 224/645; 224/656; 190/107; 220/9.2
(58) Field of Search ................................ 224/576, 627, 224/634, 645, 656; 190/107; 220/9.2, 666, 904

(56) References Cited

U.S. PATENT DOCUMENTS 4,334,643 A * 6/1982 Farmer ........................ 224/153
5,490,619 A * 2/1996 Boyar ......................... 224/153
5,503,314 A * 4/1996 Fiscus ........................ 224/665
6,435,391 B1 * 8/2002 Vazquez ...................... 224/656
2001/0017307 A1 * 8/2001 Bentzen ....................... 224/634
2002/0125277 A1 * 9/2002 Lim et al. .................... 224/261

* cited by examiner

Primary Examiner—Stephen K. Cronin
(74) Attorney, Agent, or Firm—Law Offices of Royal W. Craig (57) ABSTRACT A collapsible decoy bag utilized to carry hunting supplies/accessories such as water fowl decoys. The decoy bag includes a collapsible, semi-rigid, spring-reinforced frame covered by a fabric shell formed of flexible panels. The fabric shell includes a top cover with drawstring opening to facilitate the loading and unloading of the bag with decoys, a mesh side panel to allow drainage, and a reinforced bottom panel to prevent wear and allow dragging. A shoulder harness is provided to allow a hunter to carry the bag across one or both shoulders like a backpack. In use, the present invention remains upright and open to facilitate the decoy unloading/loading process. The decoy bag is fully collapsible for ease of storage when not in use, and includes snaps for maintaining the collapsed configuration.

20 Claims, 7 Drawing Sheets

COLLAPSIBLE DECOY BAG

CROSS-REFERENCE TO RELATED APPLICATIONS

The present application derives priority from U.S. Provisional Patent Application No. 60/366,365 for "COLLAPSIBLE DECOY BAG" filed Mar. 20, 2002.

BACKGROUND OF THE INVENTION

1. Field of the Invention

The present invention relates to hunting accessories and, more particularly, to a collapsible decoy bag for carrying and protecting decoys of the type used in hunting water fowl.

2. Description of the Background

Typically, an individual hunting water fowl (e.g. ducks, geese) deploys a number of decoys in the vicinity of his/her camouflaged position/location. This is done to draw the target water fowl closer to the hunter's position in order to provide the best opportunity for a clean shot. Unfortunately, the best hunting locations are generally some distance from the closest roadway or vehicle parking area, and the aforementioned decoys are only one of many supplies/accessories (e.g. firearm(s), ammunition, food) that must be transported from the vehicle to the hunting location.

Others have addressed the problem of carrying or transporting hunting supplies/accessories. Examples of devices for this purpose are found in U.S. Pat. Nos. 6,336,576 to Easter, 6,276,698 to Calandra, and 5,769,431 to Cordova. However, none of the aforementioned patents is drawn specifically to bags designed to transport water fowl decoys. This particular application brings with it a particular set of needs. For one, decoys are heavy items and a decoy bag must be very durable in order to withstand their weight. Moreover, none of the foregoing or other known decoy bags are designed to maintain a standing position while decoys are thrown into it. It is much more convenient if the bag stands upright as this speeds pick up. However, these existing bags typically lack enough ballast to stand up against the weight of a laterally-thrown decoy. In addition, a good decoy bag must be capable of drainage because decoys are often soaking wet. Also, the bag must be capable of withstanding transport over rough and wet terrain. For example, existing decoy bags are typically dragged over ground or through tidal pools, or carried over the shoulder. Preferably, the bag should facilitate all of these various modes of transport. It is the present inventor's goal to integrate all of the foregoing qualities in a fully collapsible decoy bag that stows (maintaining its collapsed configuration) in a relatively small space.

With a view toward traditional decoy bags, there are a number of buoyant decoy bags that are designed to float during the deployment or collection of the decoys. Unfortunately, the floating decoy bags are typically flexible fabric bags incorporating some sort of buoyant structure, but lacking any internal framework to maintain the bag in an upright position with its mouth open during an unloading or loading process. To unload/load a bag of this nature requires the hunter to hold onto the bag somewhere near the opening with one hand while removing/inserting the decoys with the other. Also, these bags tend to collapse of their own weight and this makes loading and unloading difficult (i.e. a decoy hidden within the folds of the bag may be overlooked and not deployed, or the hunter may have some difficulty getting all of the decoys back into the bag).

Therefore, there remains a need for an improved decoy bag that provides an increased degree of utility in the carrying and the unloading or loading, in the field, of hunting supplies/accessories, and yet is fully collapsible for storage. An apparatus of this type should be self-supporting to avoid the need to manually hold it upright and fully expanded during unloading/loading, self-expanding prior to loading, fully collapsible after unloading to allow for ease of storage, lightweight for optimum portability, and economical to manufacture to provide for widespread use.

SUMMARY OF THE INVENTION

It is, therefore, the primary object of the present invention to provide an improved decoy carrying bag for use in transporting various hunting supplies/accessories.

It is another object of the present invention to provide an improved decoy carrying bag that is self-expanding to facilitate its loading.

Yet another object of the present invention is to provide an improved decoy carrying bag that is self-supporting in its fully expanded state, even as against the weight of decoys that are thrown into it.

It is still another object of the present invention to provide an improved decoy carrying bag that is readily collapsible after unloading to facilitate ease of storage.

It is another object of the present invention to provide an improved decoy carrying bag that is lightweight to optimize its portability.

Yet another object of the present invention is to provide an improved decoy carrying bag that is durable to maximize its longevity.

Still another object of the present invention is to provide an improved decoy carrying bag that is economical to manufacture.

These and other objects are accomplished by a collapsible decoy bag utilized to carry hunting supplies/accessories such as water fowl decoys. The present invention generally comprises a collapsible, semi-rigid, spring-reinforced frame designed to support one or more flexible panels that retain any objects placed therein. The top panel has a drawstring opening to facilitate the loading and unloading of the apparatus. The flexible side, top, and bottom panels are fabricated of mesh-like materials allowing the items within the apparatus to be seen. One or more straps are provided to allow a hunter to carry the bag across one or both shoulders like a backpack. When in its expanded configuration the present invention remains upright and open, even as against the weight of thrown decoys, thereby facilitating the decoy unloading/loading process. In its collapsed configuration the present invention remains compact and flat for easy storage.

The dimensions of the collapsible decoy bag may be varied to suit a wide range of applications and configurations (e.g. round, square, or rectangular cross-sections). The decoy bag is fully collapsible for ease of storage when not in use. The top panel with its drawstring closure encloses the compressed, spring-reinforced frame to maintain the decoy bag in the collapsed state. The fabric may be any of a variety of strong, lightweight materials to provide the durability and portability required by the nature of its usage. The present invention's design is simple and straightforward, and can be economically manufactured.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

Figure 1:
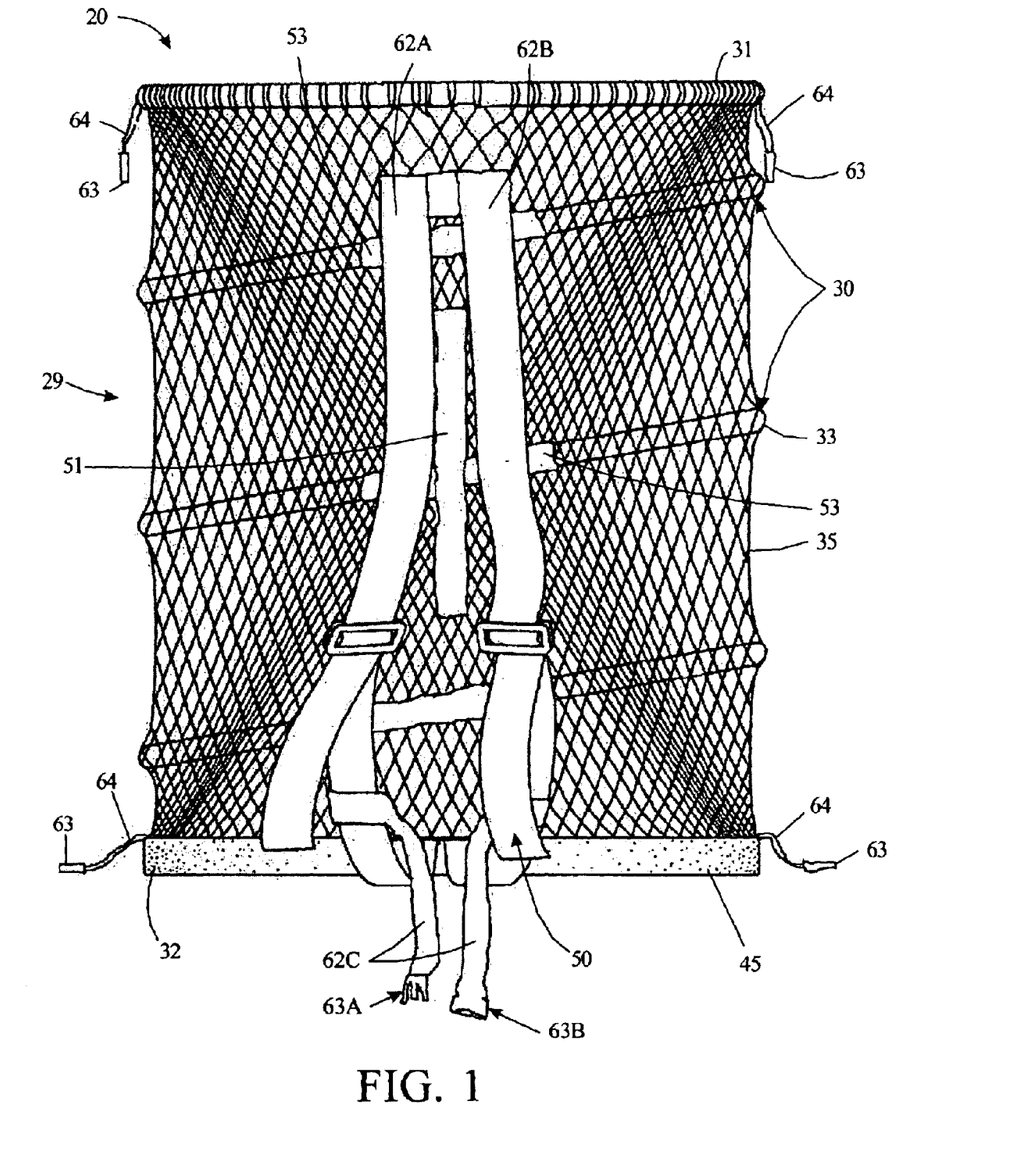
FIG. 1 is a rear-side perspective view of the collapsible decoy bag 20 according to a preferred embodiment of the present invention.
Figure 2:
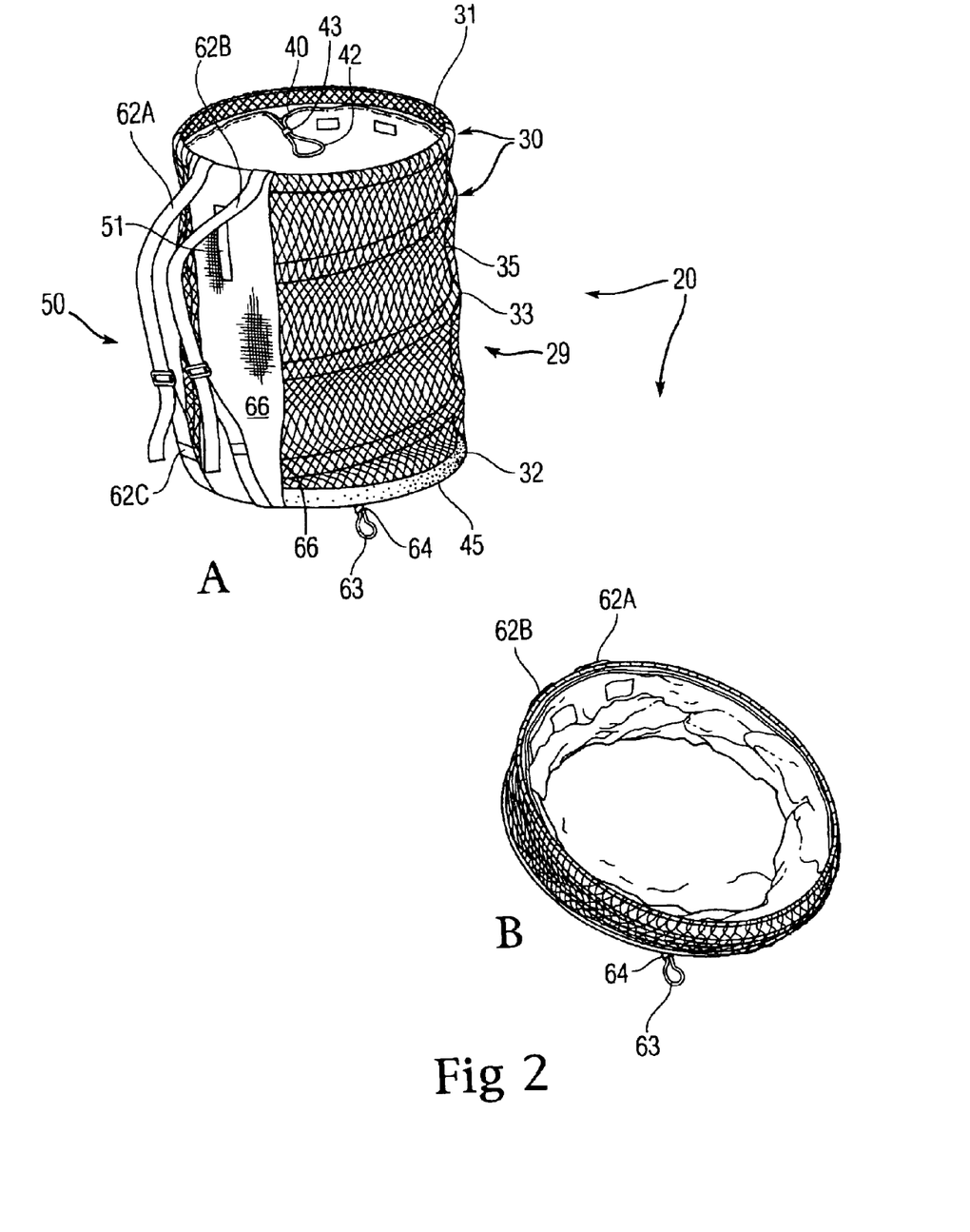
FIG. 2 is composite side perspective view of the collapsible decoy bag 20 of FIG. 1 illustrating its transformation from the expanded to collapsed configuration.
Figure 3:
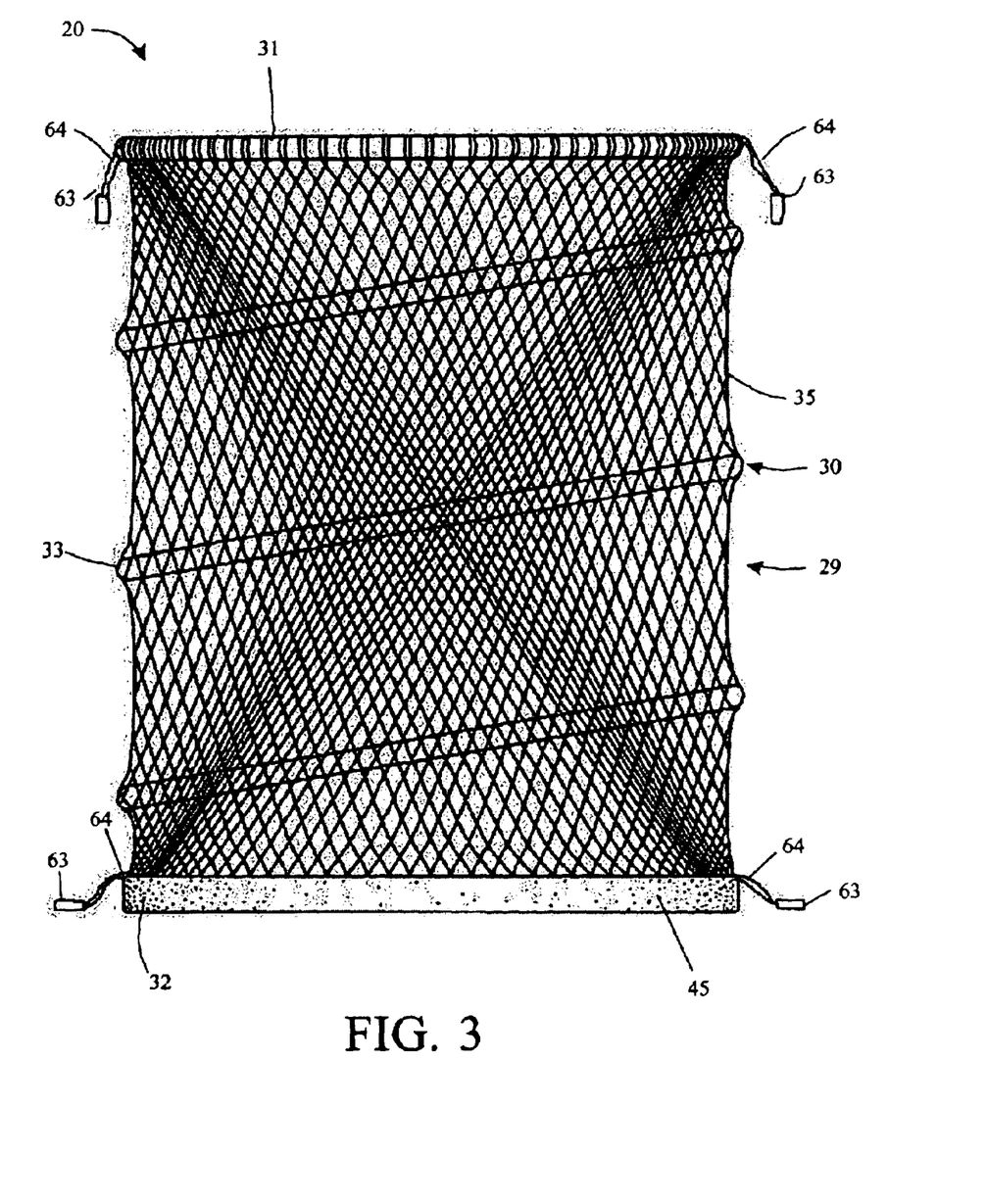
FIG. 3 is a front view of the collapsible decoy bag 20 as in FIGS. 1 & 2.

FIG. 1 is a rear-side perspective view of the collapsible decoy bag 20 according to a preferred embodiment of the present invention. FIG. 2 is composite side perspective view of the collapsible decoy bag 20 of FIG. 1 illustrating its transformation from the expanded state (A) to collapsed configuration (B). FIG. 3 is a front view of the collapsible decoy bag 20 as in FIGS. 1 & 2. With collective reference to all of FIGS. 1–3, the decoy bag 20 generally comprises a collapsible, semi-rigid and yet resilient, spring-reinforced frame 30 designed to support a fabric shell 29. In the illustrated embodiment the fabric shell 29 further comprises a flexible side panel 35, a flexible top panel 40, and a bottom panel 45. The flexible top panel 40 is an open mouth adapted for selectable closing to secure the contents, or opening to allow substantially unrestricted access to the top of the bag. Preferably, the top panel 40 may be closed tight and secured by a drawstring 42 to contain the contents while transporting.

The side and top panels 35, 40, respectively, are preferably fabricated of commercially available polyester, nylon or other lightweight yet durable fabric material. Woven fabric mesh is preferred because of its superior drainage ability, although any of the foregoing materials can be selectively perforated to achieve the same function. This increases toughness and durability, permits the user to view the contents of the decoy bag, and allows free drainage from inside. The mesh materials utilized for the panels 35, 40 are also lightweight and easy to clean. Additionally, the mesh material construction possesses a degree of elasticity in order to maximize the volume of supplies/accessories that may be loaded into the bag 20 (i.e. to extend slightly beyond/between the dimensions of the stays 31, 32 and member 33).

The top panel 40 includes an open mouth to facilitate the loading and unloading of the decoy bag 20. The opening mouth of the top panel 40 includes a drawstring closure 42 secured in a margin thereof to allow the user to vary the size of the opening, or close it completely. A conventional locking slide device 43, installed on the drawstring 42, allows the user to set the opening to whatever size is required for loading/unloading, or to hold the decoy bag 20 closed to retain any objects placed therein.

The bottom panel 45 may also be mesh or other flexible fabric, containing just enough material to span the circle formed by the bottom stay 32. Preferably, the bottom panel 45 is reinforced such as by doubling or rubberizing the fabric to allow dragging. Alternately, the bottom panel 45 may be a rigid plastic such as the vacuum formed base of most conventional golf bags. This provides additional durability (i.e. to allow the decoy bag 20 to be dragged along the ground).

The semi-rigid frame 30 preferably takes the form of a large compression spring with a top circular stay 31, a bottom circular stay 32, and a spiral supporting member 33 which serves as an expandable link between the top and bottom stays 31, 32. One end of the spiral supporting member 33 is fixedly attached to the top stay 31, the other end is fixedly attached to the bottom stay 32. The top and bottom stays 31, 32 are preferably fabricated of a rigid, lightweight, commercially available spring steel, resilient plastic, or fiberglass possessing structural resiliency (e.g. flexibility, memory) appropriate for use in a spring-like configuration/manner. The spiral member 33 is preferably fabricated of the same material, and one skilled in the art would appreciate that the entire semi-rigid frame 30 including top circular stay 31, bottom circular stay 32, and spiral supporting member 33, may be integrally formed from one coiled piece of spring steel (or one molded plastic coil), or other rigid materials possessing structural resiliency.

For ease of transportation, a shoulder harness 50 is provided to allow a user to carry the bag 20 across one or both shoulders like a backpack. In addition, a vertical strip 51 is sewn at both ends onto the side panel 35 to provide a single-handed carry handle for carrying or dragging. Preferably, the shoulder harness 50 further comprises two adjustable-length shoulder straps 62a and 62b attached to the side panel 35 in an inverted V-configuration allowing the user to wear it in a manner similar to a backpack. In addition, an adjustable waist-belt 62c joins the shoulder straps 62a and 62b to keep them from separating, waist belt 62c further comprising a short length of strap extending from each shoulder strap 62a and 62b and attachable together via a detent-lock buckle 63a, 63b or other belt-fastening means.

A series of strips 53 are sewn over each coil of the of the spring-reinforced frame 30 in the area directly behind the shoulder harness 50. The strips 53 may be foam, vinyl, canvas, or other rugged material and serve the dual purpose of reinforcing the mesh side panel 35 as well as buffering the user's shoulders when carrying by shoulder harness 50. Rather than foam strips 53, a unitary foam pad 66 (as shown in FIG. 2A) can be used to minimize any discomfort caused by the rigid/semi-rigid stays 31, 32 and spiral member 33 a shoulder strap 50 to facilitate its carrying.

In its expanded form of FIGS. 1 and 2A, the frame 30 is self-supporting—there is no need for the user to provide any additional support to maintain the decoy bag 20 in an upright configuration. In use, the decoy bag 20 remains upright and open to facilitate the decoy unloading/loading process. This is true even as against the weight of decoys that are thrown into it because the spring-like configuration allows the top mouth of the bag 20 to take a blow and then bounce back to erect.

Figure 4:
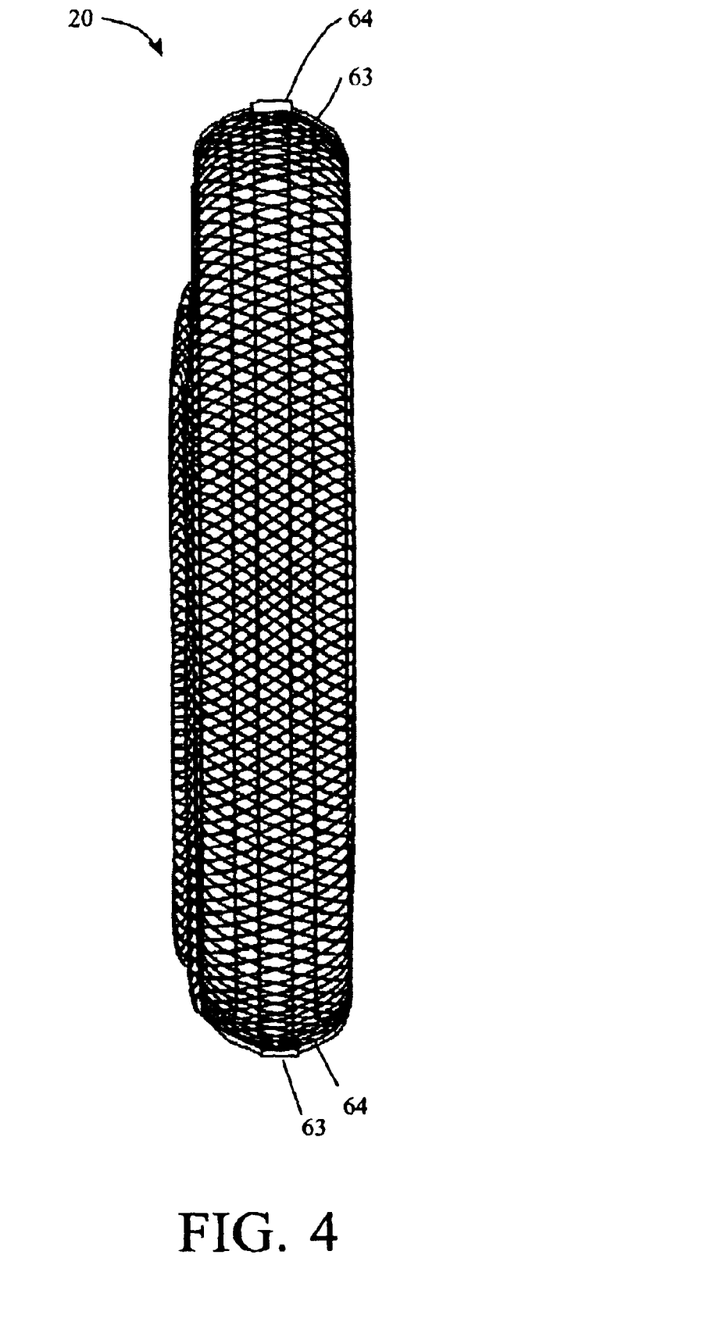
FIG. 4 is a side view of the collapsible decoy bag 20 as in FIGS. 1–3 in a collapsed configuration.

The decoy bag 20 may be fully collapsed and stowed in its collapsed configuration for ease of storage when not in use. The following steps represent the typical procedure for collapsing the decoy bag 20 once it has been emptied. With the bag 20 resting on a substantially flat surface, the user applies downward pressure to the top stay 31. Ideally, the downward force is evenly distributed about the circumference of the top stay 31. This causes the spring-like spiral member 33 to be compressed causing top stay 31 to approach within a few inches of bottom stay 32. FIG. 4 is a side view of the collapsible decoy bag 20 as in FIGS. 1–3 in a fully collapsed configuration.

Figure 5:
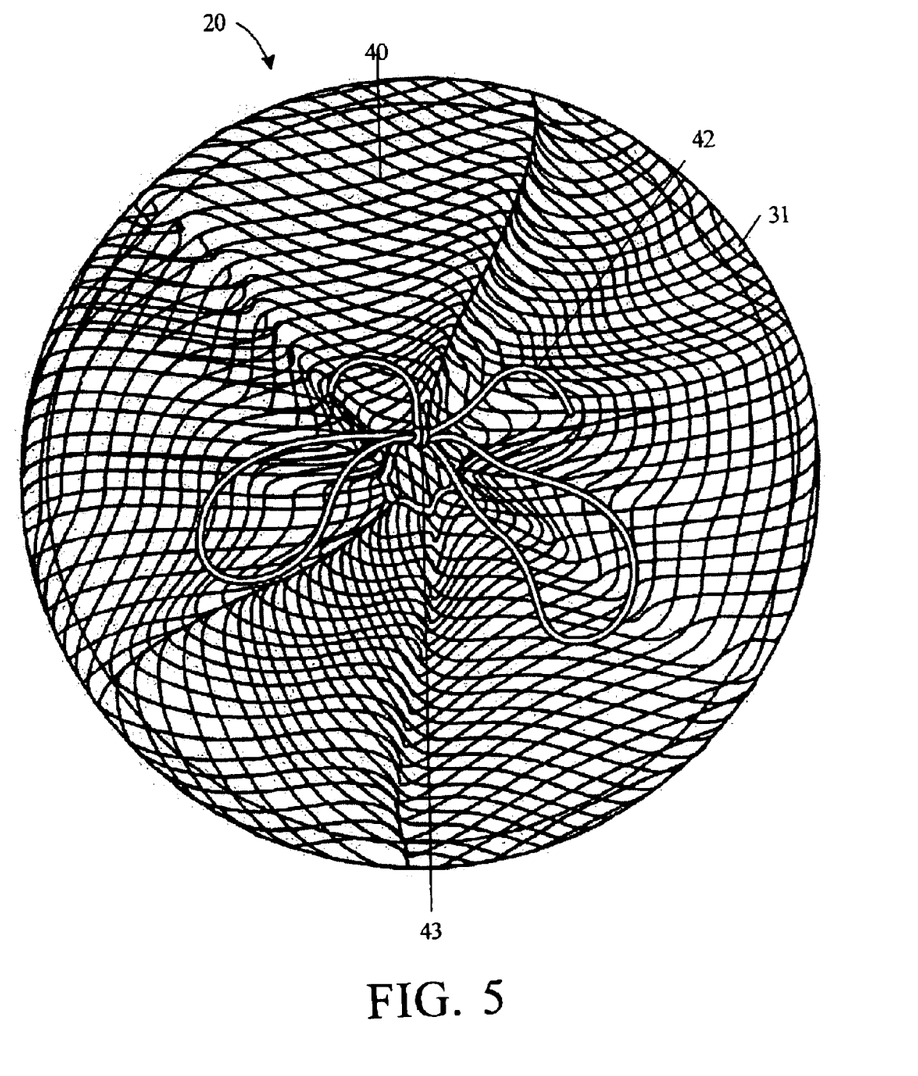
FIG. 5 is a top view of the collapsible decoy bag 20 as in FIGS. 1–4.

The decoy bag 20 according to the present invention is maintained in a collapsed form in one of two ways. First, male and female snaps 63 are mounted on cloth loops 64 that are positioned around the periphery of the top and bottom, respectively. Snaps 63 are brought together when the bag 20 is collapsed, and they are snapped tight (see FIG. 2B). Thus, while maintaining the bag 20 in its compressed configuration, the male and female snaps 63 located around the periphery of the top and bottom are snapped tight. The male/female snaps 63 make it easy to constrain the bag 20 since the user can hold the bag 20 tight with one hand while fastening the snaps 63 with the other. Alternatively, the top panel 40, with its drawstring closure 42 (see discussion below), is formed with slack material somewhat in excess of that actually required to span the circle formed by the top stay 31. The excess material in the top panel 40 can be utilized to maintain the decoy bag 20 in its collapsed state by looping the excess material present in the top panel 40 over the outside of the top stay 31, the spiral member 33, the collapsed side panel 35, and the bottom stay 32, thereby enveloping the decoy bag 20. The drawstring closure 42 is then closed by tightening the slide device 43. This procedure encloses the top stay 31, the spiral member 33, the side panel 35, and the bottom stay 32 within the excess material of the top panel 40 and again holds the decoy bag 20 in a collapsed configuration (see FIG. 5 top view of the collapsible decoy bag 20 as in FIGS. 1–4 in collapsed and enveloped state).

To return the present invention to its fully expanded state, the user need only unsnap the snaps 63 and/or set the drawstring closure 42 to its maximum open dimension and position the collapsed bag 20 on its bottom stay 32. The spring action of spiral member 33 will then extend the decoy bag 20 to its maximum height.

Returning to FIGS. 1–3, as is readily perceived in the foregoing description, the design of the collapsible decoy bag 20 utilizes a variety of strong, lightweight materials to provide the durability and portability required by the nature of its usage, is simple and straightforward, and may be economically manufactured. The flexible design (i.e. dimensions/volume, configuration) of the bag 20 allows for a myriad of uses in the transportation of various hunting supplies/accessories. The collapsed form of the first embodiment (see FIGS. 2B and 4) measures approximately 24" diameter×4" thick, providing for easy storage.

One skilled in the art would appreciate that alternatively-shaped embodiments of the present invention may also incorporate square or rectangular cross-sections (i.e. square or rectangular top and bottom members). However, the coiled spring configuration as illustrated has been found to excel at maintaining the decoy bag 60 upright as decoys are tossed into it.

Figure 6:
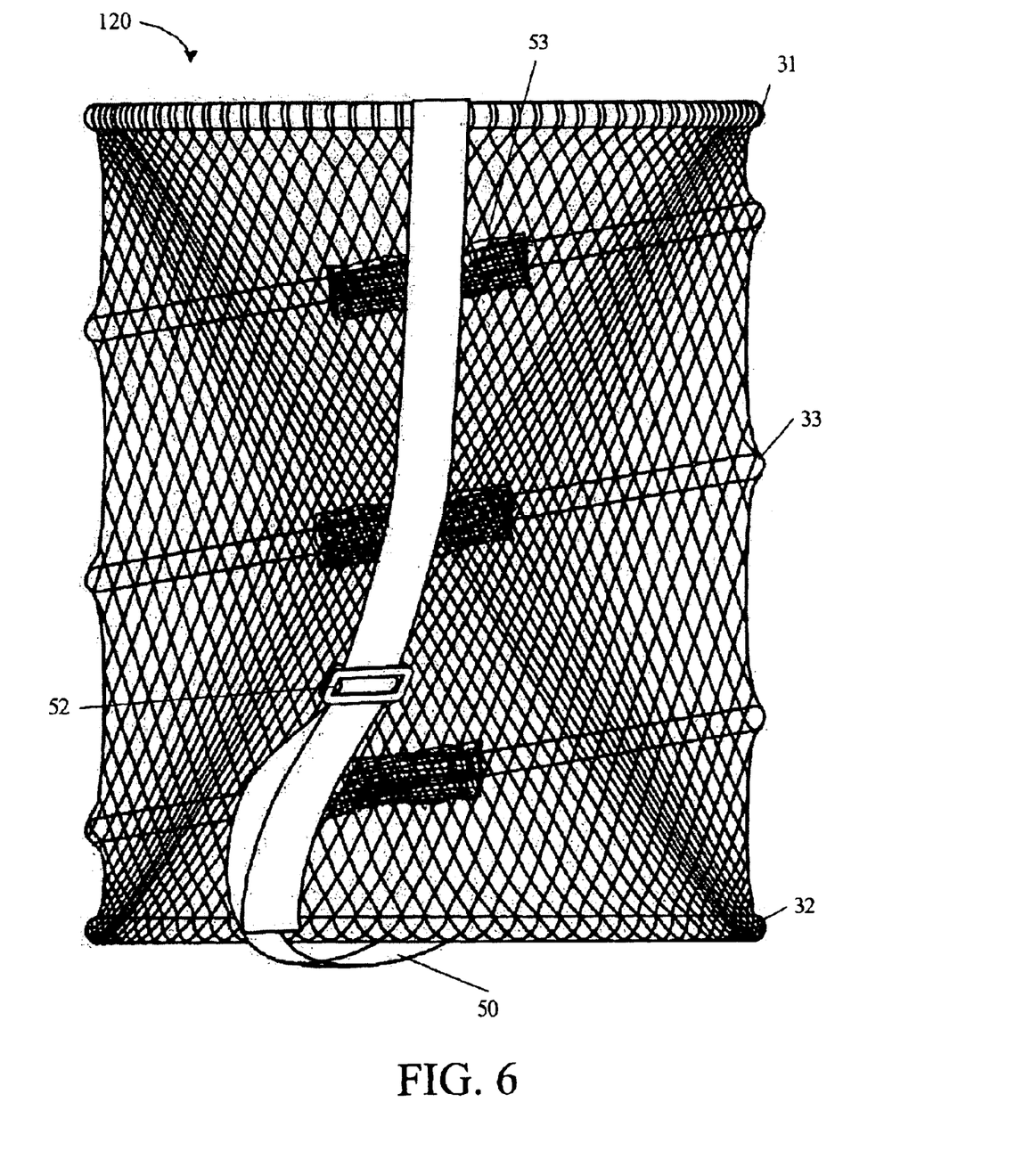
FIG. 6 is a rear-side perspective view of a collapsible decoy bag 120 according to an alternate embodiment of the present invention.

FIG. 6 is a rear-side perspective view of a collapsible decoy bag 120 according to an alternate embodiment of the present invention. In this embodiment the shoulder harness 50 comprises a two-section adjustable-length strap with one end fixedly attached to the top stay 31 and the other end fixedly attached to the bottom stay 32, and a conventional slide-buckle 52 joining the free ends in adjustable-length configuration. The two sections of the single-strap shoulder harness 50 are preferably fabricated of a commercially available material such as nylon or polyester web, and it allows the decoy bag to be draped and carried over one shoulder rather than two.

Figure 7:
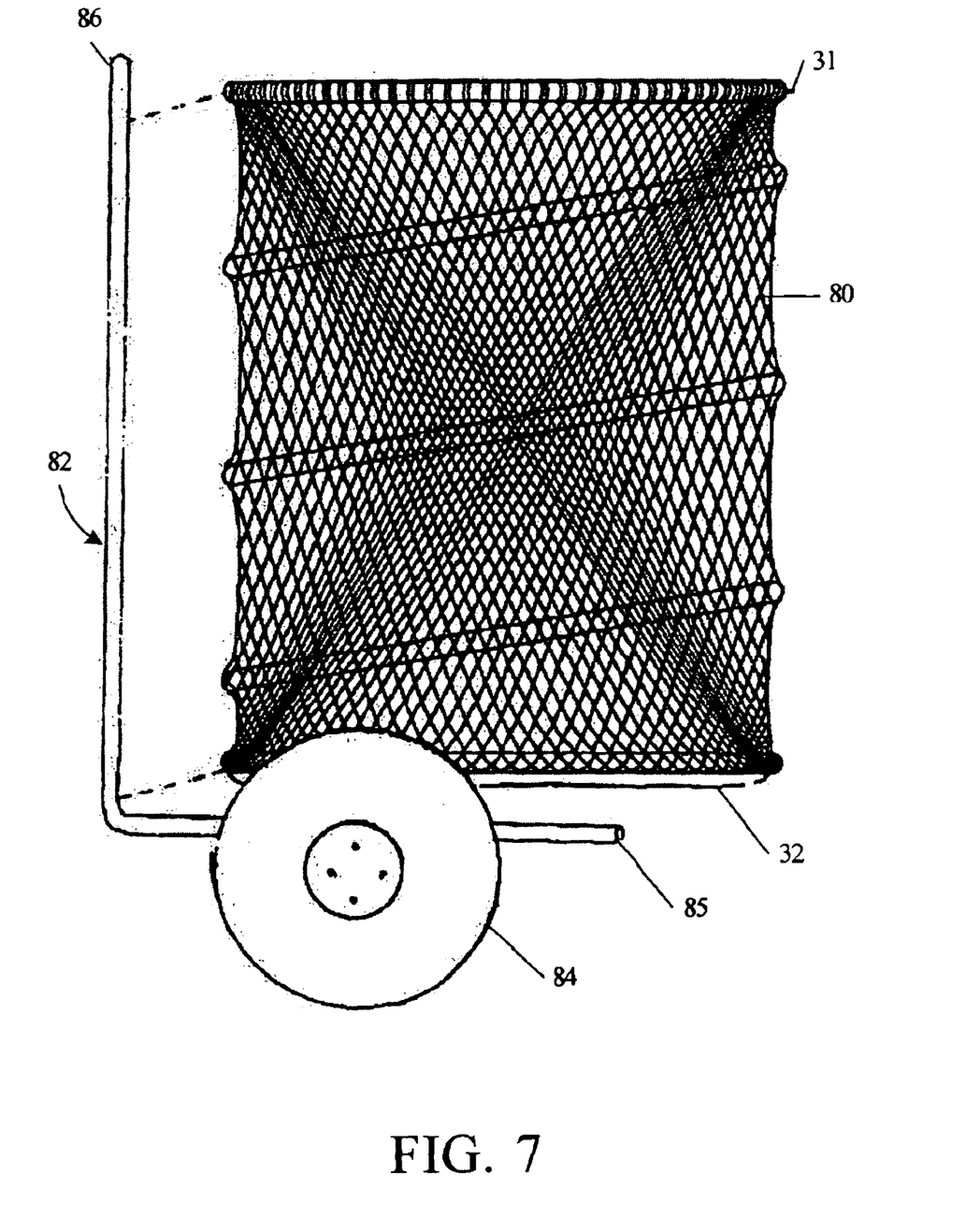
FIG. 7 is a rear-side perspective view of an optional wheeled support frame 82 for use with any of the collapsible decoy bags 20, 120 per above.

FIG. 7 is a rear-side perspective view of an optional wheeled support frame 82 for use with either of the collapsible decoy bags 20, 120 per above. The wheeled frame 82 preferably includes two wheels 84, a handle 86 that extends upward beyond the top stay 31, and a bottom support 85 for supporting the weight of the load. The wheeled frame 82 may be an integral component of the overall decoy bag 20, 120 (i.e. sewn, glued or riveted thereto), or it may take the form of a separable dolly that is attachable/detachable as required. If detachable, snaps or VELCRO® closures may be provided at the contact points along the top and bottom stays 31, 32, respectively. In either case, the incorporation of a wheeled frame 82 allows the user to roll the bag 80 over rough terrain rather than dragging.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. A collapsible storage bag for hunting equipment such as decoys and the like, comprising:
   a collapsible frame including a top stay, a bottom stay, and at least one expanding central support attached between said top and bottom stays;
   a fabric shell covering the bottom stay and central support of the collapsible frame;
   a shoulder harness for carrying the collapsible storage bag;
   wherein said collapsible frame and fabric shell form a three-dimensional, collapsible assembly enclosing a volume.

2. The collapsible storage bag according to claim 1, wherein said shoulder harness comprises at least one adjustable-length shoulder strap fixedly attached to said fabric shell between the top stay and at the bottom stay.

3. The collapsible storage bag according to claim 1, further comprising a plurality of sets of mating fasteners attached around the periphery of the top and bottom stays, respectively, and connectable together when the storage bag is collapsed, to maintain the storage bag in said collapsed configuration.

4. The collapsible storage bag according to claim 1, further comprising a wheeled support frame detachably attached to said collapsible frame.

5. The collapsible storage bag according to claim 1, wherein the fabric shell further comprises an open top panel attached to the top stay, and a drawstring threaded through a margin of said open top panel to allow selectable closing of the inner volume by the drawstring.

6. The collapsible storage bag according to claim 5, wherein said open top panel with drawstring closure is formed with an excess amount of material to allow it to be inverted around the collapsed storage bag to envelop and maintain it in a collapsed state.

7. The collapsible storage bag according to claim 5 wherein said drawstring further comprises a locking mechanism to maintain an opening at any user-defined size.

8. The collapsible storage bag according to claim 1, wherein said shoulder harness comprises a pair of shoulder straps fixedly attached to said fabric shell between the top stay and at the bottom stay.

9. The collapsible storage bag according to claim 8, wherein said shoulder straps are each adjustable length.

10. The collapsible storage bag according to claim 8, further comprising a waist strap connectable between said pair of shoulder straps.

11. The collapsible storage bag according to claim 1, wherein the expanding central support attached between said top and bottom stays further comprises a resilient spiral-shaped spine.

12. The collapsible storage bag according to claim 11 wherein said top stay, said bottom stay, and said spiral spine are fixedly attached in the form of a large compression spring.

13. The collapsible storage bag according to claim 11 further comprising a plurality of reinforced strips each fixedly attached along a coil of said spiral-shaped member behind said shoulder harness to avoid wear.

14. The collapsible storage bag according to claim 11, wherein the fabric shell further comprises a flexible side panel section fixedly attached to the expending central support and expandable therewith.

15. The collapsible storage bag according to claim 14, wherein the flexible side panel section is formed of mesh fabric for drainage.

16. The collapsible storage bag according to claim 15, wherein the fabric shell further comprises a reinforced bottom panel section attached to said bottom stay.

17. The collapsible storage bag according to claim 16 wherein said reinforced bottom panel section further comprises a flexible, rubberized fabric.

18. The collapsible storage bag according to claim 16 wherein said bottom panel section further comprises rigid, molded plastic.

19. A collapsible storage bag for hunting equipment such as decoys and the like, comprising:
 a collapsible frame including a rigid top stay, a rigid bottom stay, and at least one expanding central support attached between said top and bottom stays;
 a fabric shell covering the bottom stay and central support of the collapsible frame, said collapsible frame and fabric shell forming a three-dimensional, collapsible assembly enclosing a volume;
 a shoulder harness for carrying the collapsible storage bag; and
 a wheeled support frame, said wheeled support frame including,
  a handle extending upward beyond said top stay,
  a bottom support proximate said bottom stay and said bottom panel section, and
  a pair of wheels rotatably mounted on said bottom support.

20. The collapsible storage bag according to claim 19 wherein said wheeled support frame includes an attachment fixture for detachably attaching said wheeled support frame to said top and bottom stays.

* * * * *